United States Patent
Lamb

(10) Patent No.: US 9,264,523 B2
(45) Date of Patent: Feb. 16, 2016

(54) WIRELESS DEVICE MANAGEMENT WITH LOCAL AND REMOTE LINKS

(71) Applicant: Broadcom Corporation, Irvine, CA (US)

(72) Inventor: Lowell D. Lamb, San Ramon, CA (US)

(73) Assignee: Broadcom Corporation, Irvine, CA (US)

(*) Notice: Subject to any disclaimer, the term of this patent is extended or adjusted under 35 U.S.C. 154(b) by 56 days.

(21) Appl. No.: 13/974,485

(22) Filed: Aug. 23, 2013

(65) Prior Publication Data

US 2015/0044975 A1 Feb. 12, 2015

Related U.S. Application Data

(60) Provisional application No. 61/863,114, filed on Aug. 7, 2013.

(51) Int. Cl.

| | |
|---|---|
| *H04B 17/00* | (2015.01) |
| *H04M 1/00* | (2006.01) |
| *H04L 12/28* | (2006.01) |
| *H04W 4/00* | (2009.01) |
| *H04W 24/00* | (2009.01) |
| *H04B 17/20* | (2015.01) |
| *H04M 1/24* | (2006.01) |
| *H04M 1/725* | (2006.01) |

(52) U.S. Cl.
CPC ............. *H04M 1/00* (2013.01); *H04L 12/2856* (2013.01); *H04W 4/00* (2013.01); *H04W 24/00* (2013.01); *H04B 17/20* (2015.01); *H04M 1/24* (2013.01); *H04M 1/7253* (2013.01)

(58) Field of Classification Search
CPC ............................. H04W 24/00; H04B 17/00
USPC ............. 455/9, 67.11, 67.14, 73, 552.1, 41.1, 455/41.2, 115.1, 226.1
See application file for complete search history.

(56) References Cited

U.S. PATENT DOCUMENTS

| | | | |
|---|---|---|---|
| 7,925,935 B2 | 4/2011 | Sorbara et al. | |
| 2012/0320789 A1* | 12/2012 | Wu et al. | 370/254 |
| 2013/0311982 A1* | 11/2013 | Lal | 717/172 |
| 2015/0016241 A1* | 1/2015 | Ruffini et al. | 370/216 |

OTHER PUBLICATIONS

DSL Expresse Pro, ASSIA Incorporated, Redwood City, California, Copyright 2012, 2 pages.

(Continued)

*Primary Examiner* — Tuan Pham
(74) *Attorney, Agent, or Firm* — Brinks Gilson & Lione

(57) ABSTRACT

A remote management system employs multiple wireless links, which may include a local wireless link and a remote wireless link. The remote wireless link may be in place between a troubleshooting device held by a person located at a service site, and a remote service center for a service provider, such as an Internet service provider. The local wireless link may be in place between the person at the service site and the equipment needing service, such as a DSL model provided by the service provider. Establishing the multiple links allows the service provider to troubleshoot the equipment, without incurring the substantial cost of sending a specialized service technician to the service site. As examples, the troubleshooting device may be a smart phone, the remote wireless link may be a cellular connection, and the local wireless link may be a Bluetooth or NFC connection.

20 Claims, 6 Drawing Sheets

(56) References Cited

OTHER PUBLICATIONS

DSL Expresse Pro, "The power of DSL Expresse in a mobile app," ASSIA, Inc., 2013, 2 pages.

Press Releases: ASSIA Announces Smartphone App for Quick and Easy DSL Diagnostics and Optimization, Business Wire India, Sep. 21, 2011, 1 page.
DSl Expresse, "Take Your DSL Further, Faster and into the Future," Rev. 060413, ASSIA, Inc., 2012, 4 pages.

* cited by examiner

WIRELESS DEVICE MANAGEMENT WITH LOCAL AND REMOTE LINKS

CROSS REFERENCE TO RELATED APPLICATIONS

This application claims priority to provisional application Ser. No. 61/863,114, filed Aug. 7, 2013, which is incorporated by reference in its entirety.

TECHNICAL FIELD

This disclosure relates to management and troubleshooting of devices at locations that are remote from an operations center for a service provider.

BACKGROUND

Rapid advances in electronics and communication technologies, driven by immense customer demand, have resulted in the widespread adoption of an extremely broad array of electronic devices in every aspect of society. For example, some estimates put the number of subscriber connections for cellular phones in use around the world at nearly 80% of the world's population. As another example, broadband Internet access is commonly available in the home, and provisioned with customer premises equipment such as DSL and cable modems, wireless routers, and network devices such as switches and hubs. It can be quite costly for a service provider to perform a service call and send a technician to the customer site for troubleshooting.

DETAILED DESCRIPTION

Figure 1:
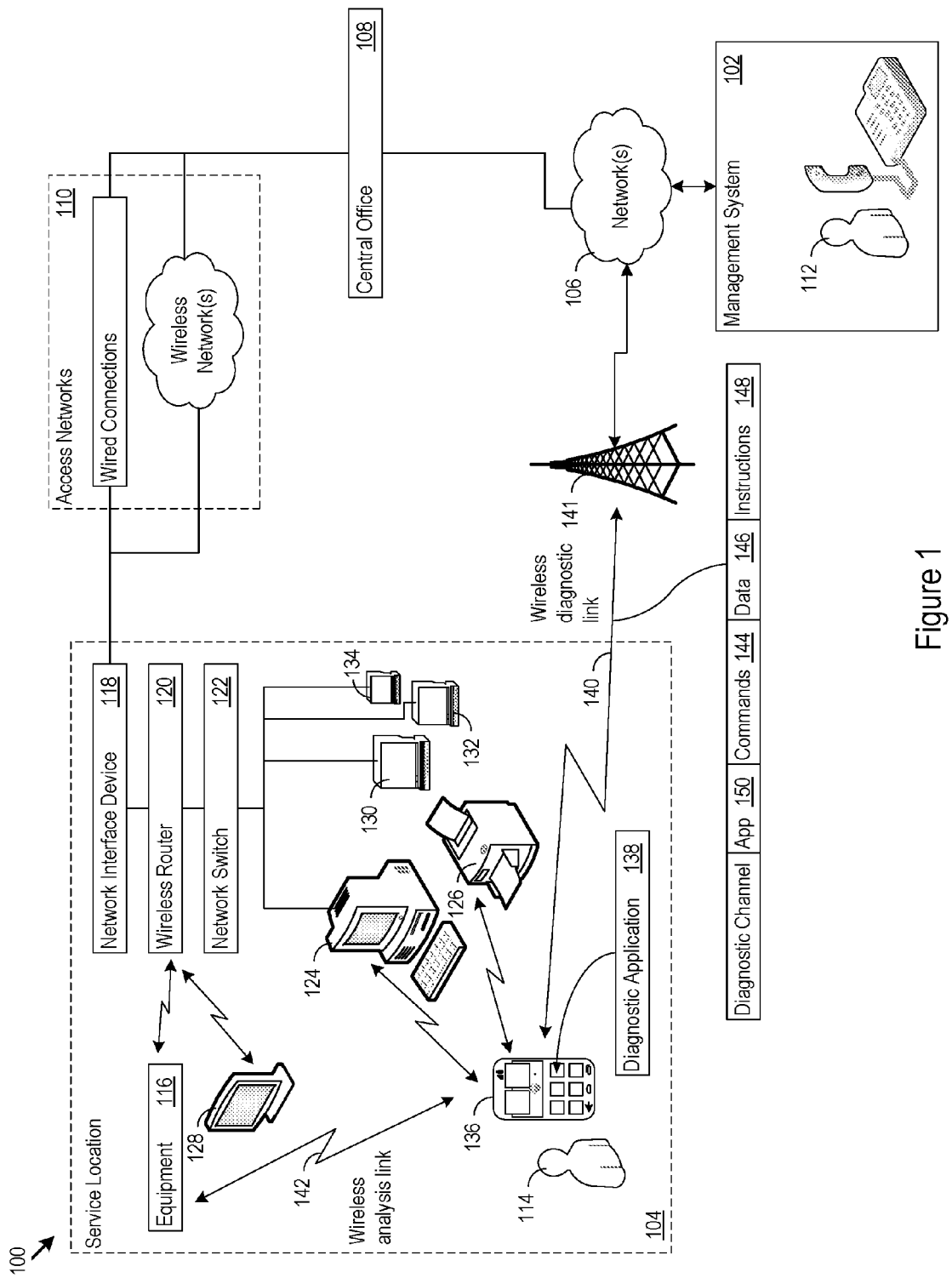
FIG. 1 shows an example network diagram.

FIG. 1 shows an example network 100 that shows a management system 102 in communication with a service location 104. The network 100 is one of many possible examples of architectures applicable to the management techniques discussed below. The network 100 connects the management system 102 to the service location 104 through one or more intermediate networks 106. In the path toward the service location 104 there may be, for example, a central office 108, and an access network 110.

As just one example, the management system 102 may be a facility associated with a network operator who provides any combination of services to customers, such as voice services, Internet (or other data) services, and phone services. The management system 102 may connect through the networks 106 to a central office 108. The central office 108 in turn connects to the service location 104 through access networks 110 which may include phone lines (e.g., for DSL Internet service), cable lines (e.g., for Cable Internet service), Radio Frequency (RF), Satellite, microwave, or other links. The service location 104 may be a home, a business, a government location, or other location that obtains services from the network operator.

At the management system 102, technicians 112 may be employed to help an individual 114 present at the service location 104 (e.g., a customer in their home) troubleshoot equipment at the service location 104. The management system 102 may be local or remote with respect to the service location 104. Further, while the management system 102 may be associated with the network operator, other third party management systems may also provide the same or similar functionality. For example, the manufacturer of a DVR or any other type of device may operate its own management system, and provide a configuration or maintenance service to purchasers of its devices. Regardless of the location of the management system 102, or the entity operating the management system 102, it may be economically costly to perform a service call to send a technician to the service location 104 to assist with troubleshooting. The techniques described below help avoid the cost of a service call, and have other advantages as well.

At the service location 104 there may be many different types of equipment 116, any of which may be subject to management actions by the management system 102. The management actions may include actions such as troubleshooting, configuration, and software and firmware upgrades, as examples. Continuing the example of the network operator, the service location 104 may include equipment such as a network interface device 118 (e.g., a DSL modem or cable modem), a wireless router 120, and a network switch 122. Additional examples of equipment include the computers 124, printers 126, displays 128, network attached storage (NAS) 130, scanners 132, and game systems 134 connected to the network either wirelessly or in a wired manner, e.g., via Ethernet.

At the service location 104, the individual 114 interacts with a diagnostic device 136. The diagnostic device 136 may run a diagnostic application 138. As one example, the diagnostic device 136 may be a smartphone with multiple communication interfaces. The diagnostic device 136 may, for example, communicate over a first wireless link 140, in some instances referred to below for clarity as a wireless diagnostic link. The first wireless link 140 may be, as examples, a cellular telephony link (e.g., a GSM, 2G, 3G, or 4G/LTE link) or a Voice over Internet Protocol (VoIP) link to a cellular base station 141 that is also in communication with the management system 102. The diagnostic device 136 may also communicate with any of the equipment at the service location 104 using a second wireless connection 142, in some instances referred to below for clarity as a wireless analysis link. As examples, the second wireless connection 142 may be a Bluetooth™ connection, a Near Field Communications (NFC) connection, a wireless network (WiFi) connection, a WiFi direct link, or another type of wireless connection.

The second wireless connection may be a local link in the sense that it exists between the diagnostic device 136 and a particular piece of equipment in the service location 104. The first wireless link may be a remote link in the sense that it connects the diagnostic device 136 to the possibly more distant management system 102. For the purposes of discussion below, the first wireless link (e.g., a cellular telephony link) is referred to as a wireless "diagnostic" link. The second wireless link (e.g., a Bluetooth™ link) is referred to as a wireless "analysis" link.

In that regard, the wireless diagnostic link may transmit and receive, as examples, management commands 144, management data 146, and management instructions 148. The management commands 144 may, as a few examples, instruct the diagnostic device 136 to connect to a piece of equipment, run a test on the equipment, gather data from the equipment, install firmware on the equipment, or set configuration settings on the equipment. The management data 146 may provide the configuration settings, the firmware, or specify data for the tests, as examples to the diagnostic device 136 and the equipment 116. The management data 146 going back to the management system 102 may include, the test results, configuration parameters, current firmware version, video or audio captured by the diagnostic device (e.g., through an onboard camera and microphone), and other data characteristic of the Device Under Test (DUT) that the diagnostic device 136 may sense, or that the DUT may report, e.g., temperature, fan speed, up-time, OS or other software version, service performance data (e.g., data rate, error rate, latency, jitter, and the like) port status, model number, serial number, link status, memory configuration, and other equipment characteristics. The management instructions 148 may specify operations for the individual 114 to perform, such as install or run the diagnostic application 138, bring the diagnostic device within local wireless range of the DUT, or perform specified actions on the equipment, as examples.

The wireless diagnostic link may also push a diagnostic application 150 to the diagnostic device 136. In that respect, the management system 102 may cause transmission of the diagnostic application 150 over the first wireless link 140 to the diagnostic device 136 (e.g., to a smartphone). The management system 102 may also instruct the diagnostic device 136 to install and execute the diagnostic application.

As one example, the wireless analysis link may operate according to Android™ operating system (OS) NFC technologies such as Android Beam or S-Beam. The diagnostic device 136 may thereby, for example, use NFC to initiate Bluetooth™ operation on the equipment and the diagnostic device 136, pair them, perform management actions, and disable the Bluetooth™ link once the management actions are complete.

One use case is that the individual 114 detects, for example, a network fault and calls the management system 102 for their network operator, e.g., on the individual's smart phone, thereby establishing the diagnostic link. On the call, the technician 112 attempts to manage the network interface device 118 using the access network 110. If the technician 112 is unsuccessful, then the technician 112 may push the diagnostic application 150 to the smartphone. The technician 112 may then instruct the individual 114, e.g., via the voice connection, or through instructions delivered through the diagnostic application 150, to stand within Bluetooth™ range of the network interface device 118. The smartphone and the network interface device 118 establish a Bluetooth™ link as the analysis link. Once established, the technician 112 may instruct the diagnostic application 150 and the individual 114 to execute management actions on the network interface device 118 to, e.g., find and correct network configuration faults and restore Internet service.

Figure 2:
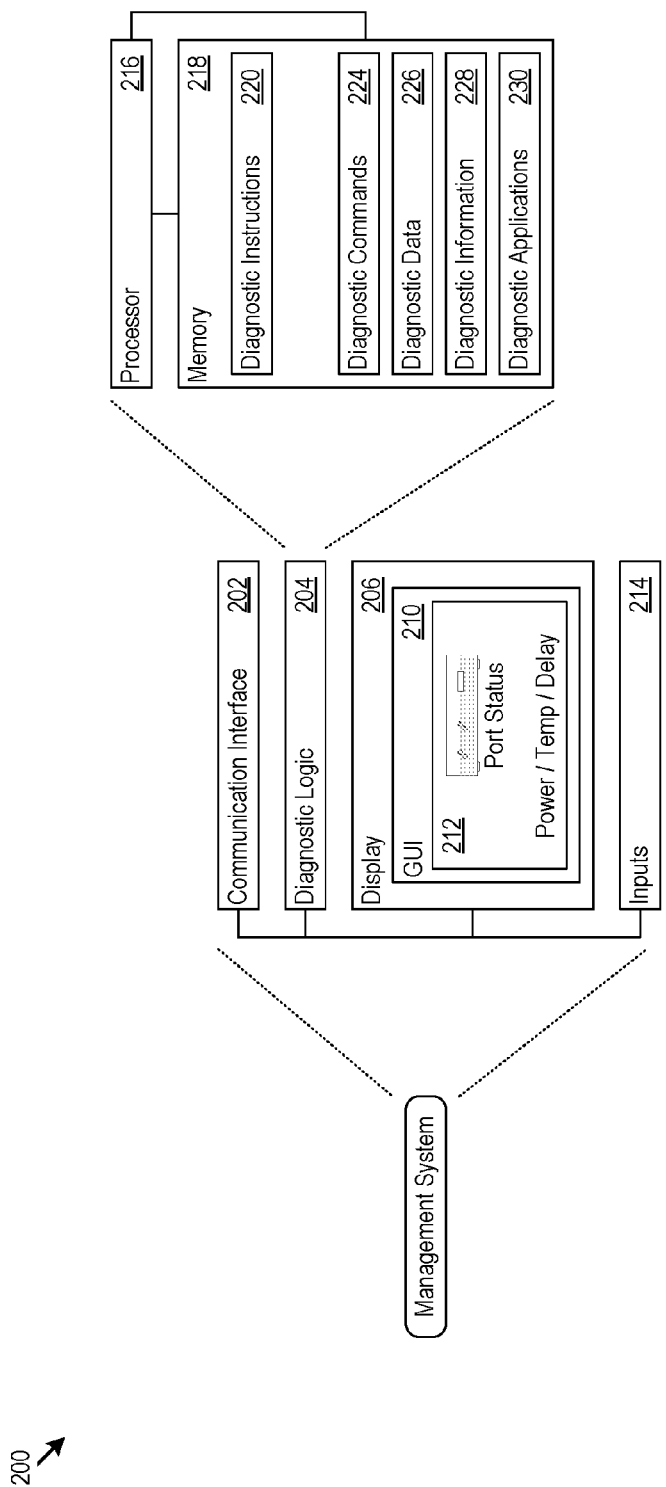
FIG. 2 shows an example management system.

FIG. 2 shows an example management system 200, which illustrates one possible architecture for the management system 102 in FIG. 1. The management system 200 includes a communication interface 202, diagnostic logic 204, and a user interface 206. The communication interface 202 may include one or more Ethernet ports, cellular telephony interface, or any other type of wired or wireless communication interface for performing the communications described above with respect to FIG. 1. The communication interface 202 sends and receives, e.g., the management commands 144, management data 146, as well as management instructions 148 and the diagnostic application 150.

The user interface 206 may display, for example, a graphical user interface (GUI) 210. The user interface 206 may process any of the management commands 144, management data 146, and management instructions 148, or any other data, and display through the GUI 210 any type of equipment management interface 212, such as a troubleshooting interface, configuration interface, or upgrade interface. The equipment management interface 212 may visualize, as just a few examples, configuration settings, port activity and status, software versions, port parameters, or any other data concerning the DUT. The equipment data drives the visualization, analysis, and management of the equipment, which the diagnostic logic 204 may carry out. The user inputs 214 provide keyboard, mouse, voice recognition, touchscreen, and any other type of input mechanisms for technician interaction with the management system 200.

The diagnostic logic 204 may be implemented in hardware, software, or both. In one implementation, the diagnostic logic 204 includes one or more processors 216 and memories 218. The memory 218 may store diagnostic instructions 220 (e.g., program instructions) for execution by the processor 216. The diagnostic instructions 220 may carry out equipment management using the local and remote wireless links. The diagnostic instructions 220 may generate the GUI 210. The diagnostic instructions 220 may also receive diagnostic input from the GUI 210 and in response generate and send or receive diagnostic commands 224, diagnostic data 226, diagnostic information 228, and diagnostic applications 230 to and from the diagnostic device 136. The management system 102 may store a library of diagnostic applications, any of which it may push to the diagnostic device 136 and that is suitable for particular types of equipment (e.g., a DSL modem diagnostic app, and a color laser printer diagnostic app), types of problems encountered (e.g., loss of Internet connectivity, or inability to connect to a wireless router), or types of management actions to perform (e.g., to upgrade firmware, or run periodic maintenance checks).

In other implementations, the diagnostic instructions 220 implement an automated response system. That is, it is not necessary for a live technician 112 to be available to assist the individual 114. As one example, the automated response system may include a voice recognition system that facilitates voice driven troubleshooting with the individual 114. In other implementations, the diagnostic instructions 220 may implement interactive touch-tone menu functionality for troubleshooting, optionally including Interactive Voice Response (IVR) functionality.

Figure 3:
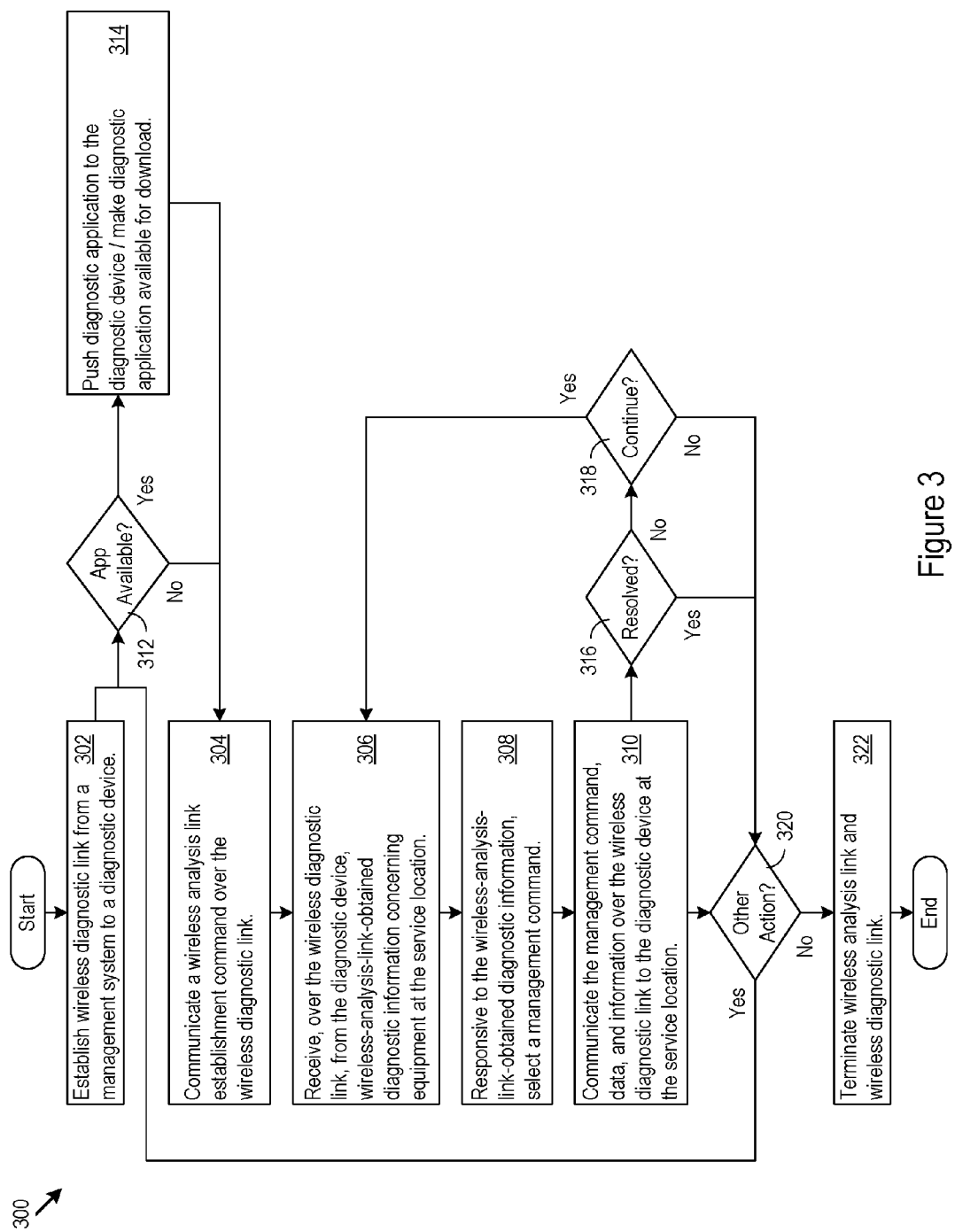
FIG. 3 shows an example of logic that may be executed at the management system.

FIG. 3 shows an example of logic 300 that may be executed at the management system 102, e.g., as the diagnostic instructions 220. The logic 300 includes establishing a wireless diagnostic link to a diagnostic device (302). The wireless diagnostic link may be a cellular telephony link, for example, over which an individual 114 may communicate with a technician 112. When the individual 114 has a diagnostic device 136 available, the logic 300 may determine whether a diagnostic application is available for handling the issue at hand (312). If so, the logic 300 may make available a diagnostic application 138 to the diagnostic device 136 (314). For example, the logic 300 may automatically push the diagnostic application 138 to the diagnostic device 136, may provide instructions to the individual 114 for downloading the diagnostic application 138, or may otherwise make the diagnostic application 138 available to the individual 114.

The logic 300 may then communicate a wireless analysis link establishment command over the wireless diagnostic link to the diagnostic device (304). The command may be configured for execution by the diagnostic application 138, for example. Alternatively, the command may be one that that the individual 114 can perform using the existing capability of the diagnostic device 136, such as creating a Bluetooth link to the DUT. The logic 300 also receives, over the wireless diagnostic link, from the diagnostic device, wireless-analysis-link-obtained diagnostic information concerning equipment at the service location (306). In other words, the management system 102 receives information about the DUT that the diagnostic device 136 has obtained through the local wireless analysis link (e.g., the Bluetooth link to the equipment).

Responsive to the wireless-analysis-link-obtained diagnostic information, the logic 300 may select a management command (308). The management command may, as one example, be a troubleshooting action determined by analysis of the diagnostic information in comparison with or with reference to equipment troubleshooting information. The management system 102 may maintain a database of equipment troubleshooting information specific to any particular equipment that the management system 102 handles. The logic also communicates the management command, data, and instructions over the wireless diagnostic link to the diagnostic device 136 at the service location (310). The management action may be, for example, instructions to the individual 114 to perform, may be actions for the diagnostic application 138 to perform, may be actions for the equipment to perform, or may be an action for another entity to perform.

The logic 300 may continue to execute management actions until a particular management goal is resolved (316). The logic 300 may also determine to end the management activity at any time (318). In addition, the logic 300 may perform as many different management actions as desired (320), for example, troubleshooting an Internet connectivity problem, then upgrading DSL modem firmware, then resetting the DSL modem, and then confirming proper Internet connectivity when the DSL modem restarts. When the logic 300 has not further actions to perform, it may send the diagnostic device an instruction to terminate the wireless analysis link, and may also terminate the wireless diagnostic link (322).

Figure 4:
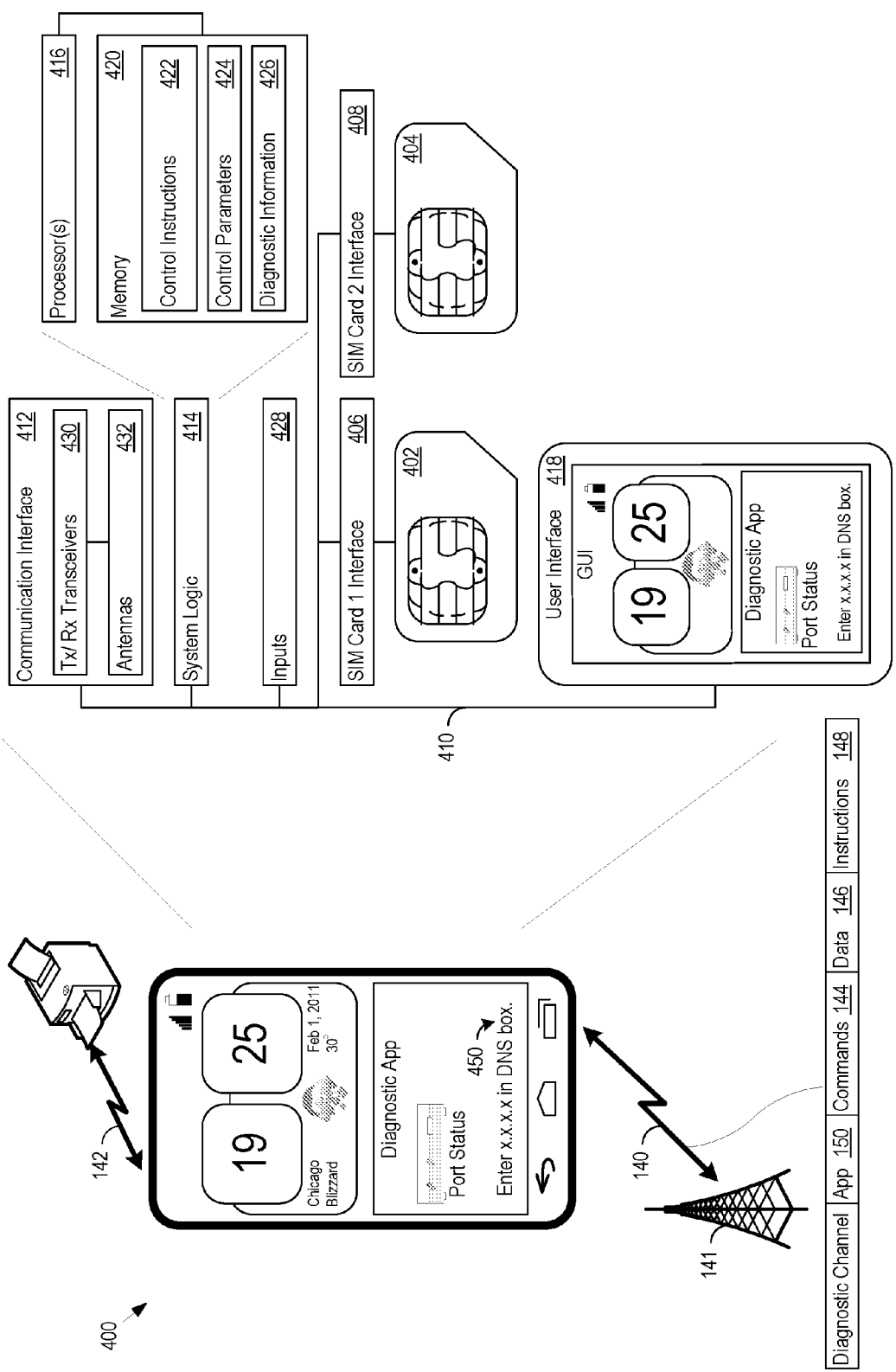
FIG. 4 shows an example of a diagnostic device.

FIG. 4 shows an example of a diagnostic device 400. The diagnostic device 400 is a smartphone in this example, but the diagnostic device may be any electronic device capable of establishing a local wireless connection to DUT. The diagnostic device 400 may support one or more Subscriber Identity Modules (SIMs), such as the SIM1 402 and the SIM2 404. Electrical and physical interfaces 406 and 408 connect SIM1 402 and SIM2 404 to the rest of the user equipment hardware, for example, through the system bus 410.

The diagnostic device 400 includes a communication interface 412, system logic 414, and a user interface 418. The system logic 414 may include any combination of hardware, software, firmware, or other logic. The system logic 414 may be implemented, for example, in a system on a chip (SoC), application specific integrated circuit (ASIC), or other circuitry. The system logic 414 is part of the implementation of any desired functionality in the diagnostic device 400. In that regard, the system logic 414 may include logic that facilitates, as examples, running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 418. The user interface 418 may include a graphical user interface, touch sensitive display, voice or facial recognition inputs, buttons, switches, speakers and other user interface elements.

In the communication interface 412, Radio Frequency (RF) transmit (Tx) and receive (Rx) transceivers 430 handle transmission and reception of signals through the antenna(s) 432. The communication interface 412 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

As one implementation example, the communication interface 412 and system logic 414 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the diagnostic device 400, are available from Broadcom Corporation of Irvine Calif.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interface 412 may include transceivers that support transmission and reception under the 4G/Long Term Evolution (LTE), Bluetooth, and NFC standards. The techniques described below, however, are applicable to other communications technologies. Accordingly, the transceivers 430 may include transceivers for the 3rd Generation Partnership Project (3GPP), GSM® Association, Bluetooth low energy, WiFi direct, 802.11 a/b/g/n/ac, Wireless Gigabit (WiGig), InfraRed (IR), audio (e.g., ultrasonic), Universal Mobile Telecommunications System (UMTS), High Speed Packet Access (HSPA)+, or other communications technologies, partnerships, or standards bodies.

The system logic 414 may include one or more processors 416 and memories 420. The memory 420 stores, for example, control instructions 422 that the processor 416 executes to carry out any of the processing functionality, working in communication with the circuitry in the communication interface 412. For example, the control instructions 422 may include a diagnostic application 138 received from the management system 102 or any other source.

The control parameters 424 provide and specify configuration and operating options for the control instructions 422. The memory 420 may also store diagnostic information 426 obtained from the DUT. Note that the diagnostic information 426 may come over the wireless analysis link 142, e.g., transmitted to the diagnostic device 400 by the DUT. In addition, the diagnostic information 426 may come from other inputs 428 to the diagnostic device 400. Examples of such inputs 428 include microphones, video and still image cameras, temperature sensors, vibration sensors, headset and microphone input/output jacks, Universal Serial Bus (USB) connectors, memory card slots, radiation sensors (e.g., IR sensors), and other types of inputs.

Figure 5:
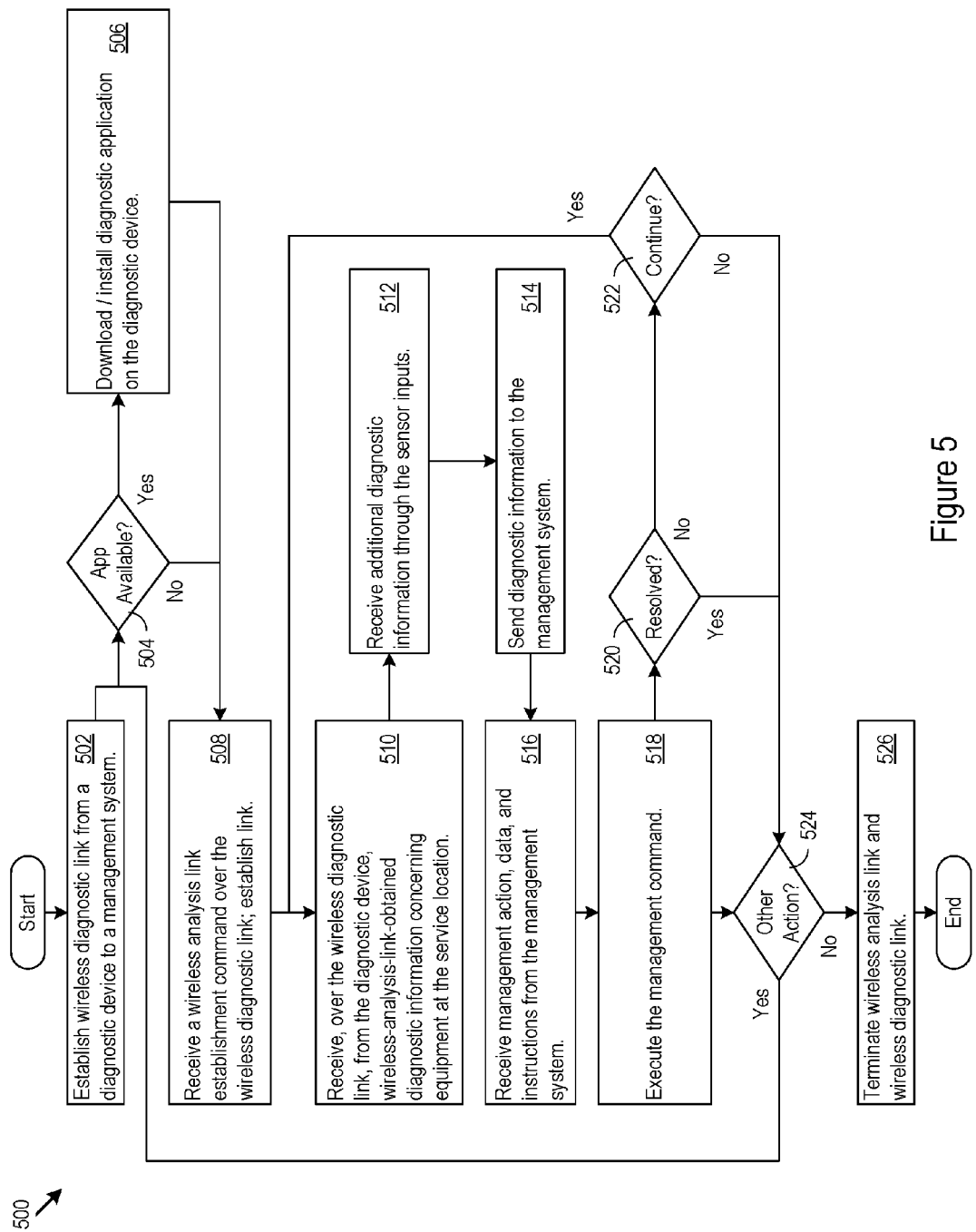
FIG. 5 shows an example of logic that may be executed by the diagnostic device.

FIG. 5 shows an example of logic 500 that may be executed by the diagnostic device, e.g., by the control instructions 422. The logic 500 includes establishing a wireless diagnostic link to a management system (502). The wireless diagnostic link may be a VoIP link, for example, that an individual 114 may use to explain an equipment problem or ask an equipment question to a technician 112.

When there is a diagnostic application available for the particular issue at hand (504), the logic 500 may automatically receive and install the diagnostic application 138 on the diagnostic device 136 (506). Alternatively, the logic 500 may receive instructions provided to the individual 114 for downloading and installing the diagnostic application 138.

The logic 500 receives a wireless analysis link establishment command over the wireless diagnostic link to the management system 102, and establishes the wireless analysis link (508). The command may be a Bluetooth link command, a WiFi direct link command, or other command that establishes a wireless link between the diagnostic device and the equipment at the service location 104. The command may be configured for execution by the diagnostic application 138 or may be an instruction or direction to the individual 114 for establishing the link through the diagnostic application or by using existing capabilities of the diagnostic device 136.

The logic 500 also receives, over the wireless analysis link, from the equipment, wireless-analysis-link-obtained diagnostic information concerning the equipment at the service location (510). In other words, the diagnostic device 136 receives information about the DUT through the local wireless analysis link (e.g., the WiFi Direct link to the equipment). In addition, the diagnostic device 136 may receive additional diagnostic information through the inputs 428, for example, to obtain a picture or a video of the equipment (512).

The logic 500 sends the diagnostic information to the management system 102 (514). In response, the logic 500 may receive a management command, data, and instructions from the management system 102 (516). The management command may be any direction to the individual 114 or the diagnostic application 138. As just a few examples, the management command may be to read configuration settings, to obtain device status, or to read firmware version information. The logic 500 executes the management command (518).

The logic 500 may continue to execute management commands until a particular management goal is resolved (520). The logic 500 may also determine to end the management activity at any time (522). In addition, the logic 300 may perform as many different management actions as desired (524). When the logic 500 has no further actions to perform, it may terminate the wireless analysis link, and may also terminate the wireless diagnostic link (526).

The system described above may have certain technical advantages, including leveraging low cost (e.g., Bluetooth) technologies, with the sophisticated, ubiquitous, consumer-friendly, and highly functional smart phone/cellular network to provide low-cost and powerful management connectivity. The techniques facilitate network operators to transfer many fault isolation and service restoration tasks to the individual 114, thus reducing the number of service calls, and otherwise lowering operational expenses. Further, the management system 102 may centralize manuals, instructional videos, software updates, and other management data in web-based repositories. This may reduce costs for equipment suppliers and network operators and simplify use by end customers. Note that the system described above may provide management connectivity to devices or systems that do not otherwise have fixed-line or short range wireless management connectivity. Examples include, but are not limited to, vehicles, power-grid elements, commercial equipment, or any other equipment not on a fixed-line network. Further, the system uses smartphone resources, such as cameras, to obtain diagnostic data and provide very flexible management functionality.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible. For instance, the equipment 116 may take many different forms. As examples, the equipment 116 may be any device equipped with a wireless transceiver (e.g., Bluetooth or WiFi) or wired interface (e.g., USB or a proprietary cabled interface), including a home stereo, television, refrigerator, microwave, exercise machine, washer or dryer, or home security system. As additional examples, the equipment may be an engine controller or diagnostic system in a vehicle, a portable gaming device, an entertainment system in the vehicle, or a climate control system in the home or in the car. Further examples of the equipment include industrial machinery such as robots, assembly lines, welders, drill presses, stamping machines, cutting machines, and the like.

The management instructions 148 may include pictures, diagrams, and videos that the diagnostic application 138 may display to assist the individual 114 in managing the equipment. The diagnostic application 138 may be provided in multiple languages, selectable by the individual 114. The diagnostic application 138 may implement security and authentication mechanisms. One example of such mechanisms include instructing the diagnostic device 136 camera to monitor the LED status indicators on the equipment, detecting a specific pattern of response in the LEDs which has been initiated via the wireless analysis link 142, and determining if the detected LED response is consistent with the expected response before management actions are carried out. Another example is to request that the individual 114 press a button on the equipment to authorize management connectivity.

In other implementations, the management capabilities may be used in a transparent mode. In the transparent mode, the individual 114 may not necessarily be aware that the management system 102 is performing equipment management through the diagnostic device 136. In transparent mode, the diagnostic device 136 may establish the wireless diagnostic link 140 automatically, e.g., when the diagnostic device 136 detects and connects to a nearby piece of equipment. In that scenario, the diagnostic device 136 may regularly perform equipment maintenance (e.g., firmware updates) whenever the diagnostic device 136 is within range of a given piece of equipment.

The transparent mode connectivity and management activities may be initiated and executed remotely, e.g., by a technician or automated system associated with the management system 102. One example use case is for residential broadband services. For example, assume that the network operator detects a fault in fixed-line network (e.g., loses connectivity with home gateway). Without contacting the subscriber, the network operator may attempt to access the home gateway using a wireless diagnostic link management connection. If successful, the network operator isolates the fault and, if possible, restores service. Otherwise, the network operator may send an email/voicemail/text alerting the subscriber of the fixed-line network impairment and recommending a corrective action.

Another example use case is the management of remote industrial equipment. For example, a technician, night watchman, robot, or other entity may move through a facility that contains a number of short-range wireless-enabled (Bluetooth, WiFi, etc.) pieces of equipment. As each such unit comes within range, the diagnostic device 136 automatically connects to it, thus allowing remote management systems to access the unit via the wireless diagnostic link and perform diagnostic and/or management functions. As stated above, the person carrying the smart phone does not need to participate in the connectivity/management activities. One benefit is that in many instances of this scenario, the person with the diagnostic device 136 does not require specialized training that a technician otherwise might need.

Figure 6:
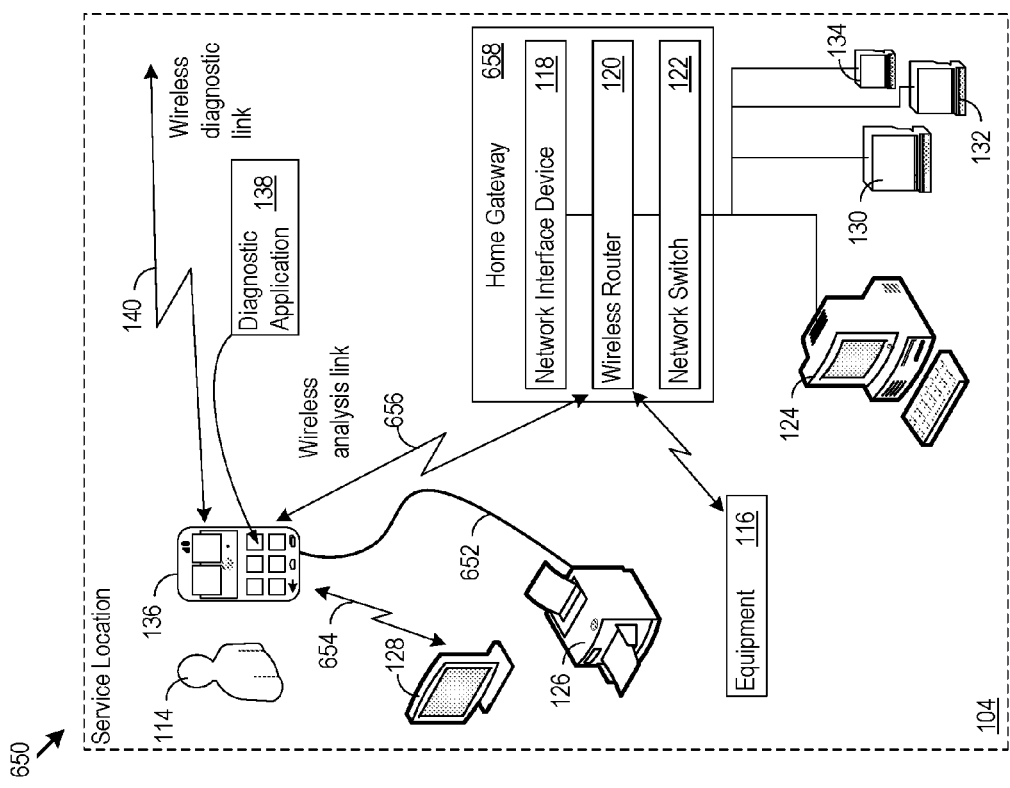
FIG. 6 shows additional examples of network diagrams.
Figure 6:
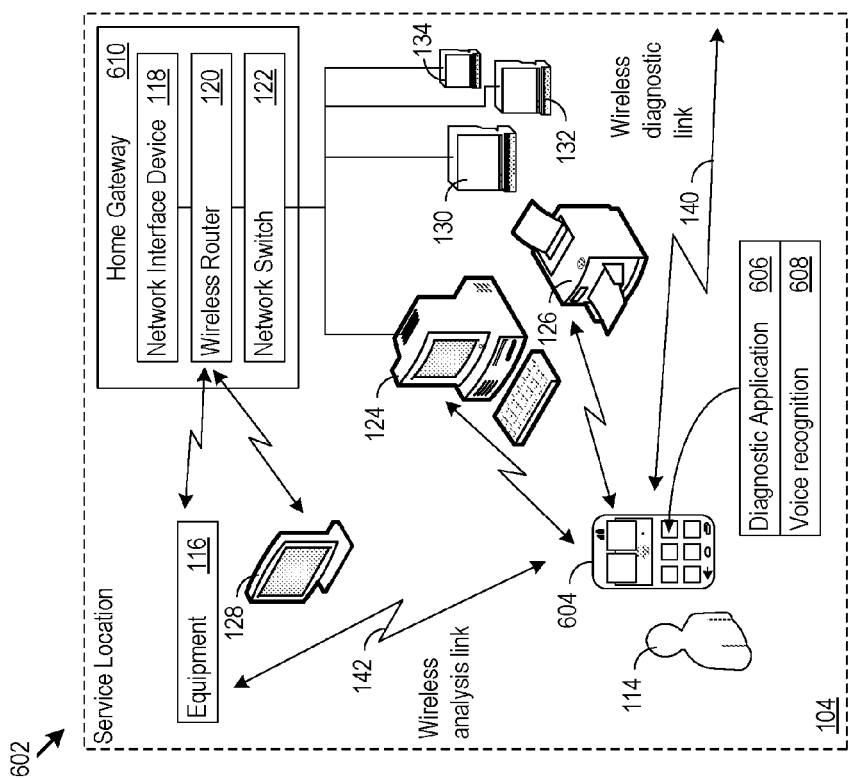

FIG. 6 shows additional examples of network configurations 602 and 650. In the configuration 602, the diagnostic device 604 includes a diagnostic application 606 extended to include any functionality provided by the management system 102. For example, the diagnostic device 604 may implement a voice recognition application 608 that provides voice driven troubleshooting of any DUT, executed directly on the diagnostic device 604. Thus, the diagnostic application 606 may provide an expert system using any combination of voice, touch, and other input for troubleshooting in addition to, or instead or, troubleshooting performed over the wireless diagnostic link 140.

The configuration 602 also shows that any of the network interface components may be part of a consolidated device. In particular, the configuration 602 shows a home gateway 610. The home gateway 610 includes the functionality associated with the network interface device 118, the wireless router 120, and the network switch 122. The home gateway 610 may be a single device provided and managed by the network operator, for example. The home gateway 610 may vary widely in functionality. For example, the home gateway 610 may or may not include the wireless router 120 or the network switch 122. In addition, the home gateway 610 may include additional functionality, such as a Digital Video Recorder (DVR), Network Attached Storage (NAS), audio/video streaming device, or other device.

FIG. 6 also shows another example configuration 650. In the configuration 650, the diagnostic device 136 obtains diagnostic information from a DUT, in this case the printer 126, over a wired connection 652. That is, in addition to using wireless connections such as Bluetooth and NFC, the diagnostic device 136 may obtain diagnostic information over cabled (e.g., wired or optical) connections, such as a USB, parallel, proprietary (e.g., a Lightning connector or iPhone™ 30-pin connector), Mobile High Definition, FireWire, or other type of cabled connection.

The example configuration 650 also shows another connectivity option. In particular, the diagnostic device 136 may provide a tethered connection 654 for any given DUT. In the example shown, the display 128 connects to a network via the tethered connection 654, with the diagnostic device 136 then acting as an access point to the network. As a result, the diagnostic device may obtain diagnostic information from the display 128 over the network link supported by the tethered connection 654. The diagnostic device 136 may provide such a connection when, for example, the wireless router 120 is not available, e.g., is powered off, or is malfunctioning, or is not present at all.

Note also that the diagnostic device 136 may also make connections to the DUTs over different types of wireless analysis links, such as a wireless network (e.g., WiFi or WiMax) link 656. That is, in addition to other types of wireless analysis links (e.g. Bluetooth and NFC), the diagnostic device 136 may attach to the wireless router 120 as a client, obtain a network address, and communicate over the network with the DUTs. As a result, the diagnostic device 136 may also obtain diagnostic data by sending queries over the network in place at the service location 104 to network connected devices at the service location 104. The example configuration 650 also shows a scenario in which a home gateway 658 includes the functionality of the network interface device 118, wireless router 120, and network switch 122. However, as explained above, the network interface device 118, wireless router 120, and network switch 122 may be separate devices instead, and additional, fewer, or different devices may be included in the home gateway 658.

In some implementations, the diagnostic device 136 may include a custom hardware or software configuration that facilitates the diagnostic techniques discussed above. As one example, the diagnostic device 136 may include a dedicated set of circuitry (e.g., a processor and firmware) dedicated to establishing any of the links described above, obtaining diagnostic information, providing diagnostic instructions, and the like. The dedicated circuitry may, for example, be separate and apart from the general purpose CPU and memory resources that the diagnostic device uses to run applications, make phone calls, handle WiFi or Bluetooth data connections, and the like. The management system 102 may then attach to the diagnostic device 136 through the dedicated circuitry, independently of other tasks and connections that the diagnostic device 136 may be running or handling. In other implementations, the diagnostic device allocates diagnostic activities to a particular core among the multiple cores present in CPU. The diagnostic device 136 may, for example, reserve a particular core for diagnostic activities to ensure that the activities have the hardware support needed to run at any given moment.

What is claimed is:
1. A diagnostic method comprising:
at a remote management system, determining to collect diagnostic information on a device under test at a service location over a wireless diagnostic link, via a mobile device at the service location, by:
at the remote management system, establishing the wireless diagnostic link to a mobile device;

instructing the mobile device, via the wireless diagnostic link, to capture diagnostic information concerning the device under test via a sensor disposed on the mobile device; and receiving over the wireless diagnostic link, from the mobile device, diagnostic information concerning the device under test.

2. The diagnostic method of claim 1, further comprising:
pushing a diagnostic application from the remote management system to the mobile device.

3. The diagnostic method of claim 2, further comprising:
instructing the mobile device to obtain the diagnostic information with the diagnostic application.

4. The diagnostic method of claim 2, further comprising:
sending instructions to execute the diagnostic application from the remote management system for display on the mobile device.

5. The diagnostic method of claim 1, further comprising:
sending instructions for diagnosis of the device under test from the remote management system to the mobile device.

6. The diagnostic method of claim 1, further comprising:
communicating an equipment configuration update from the remote management system to the mobile device; and
instructing the mobile device to transmit the equipment configuration update to the device under test, over an analysis link established between the device under test and the mobile device, for implementation in the device under test.

7. The diagnostic method of claim 1, where the wireless diagnostic link comprises a cellular telephony link.

8. The diagnostic method of claim 1, where the wireless diagnostic link comprises a voice-over-internet protocol (VoIP) link.

9. The diagnostic method of claim 1, further comprising instructing the mobile device to establish an analysis link to the device under test.

10. The diagnostic method of claim 9, where the analysis link comprises a wireless communication link to the device under test, a wired link to the device under test, or any combination thereof.

11. A diagnostic system comprising:
a processor;
a wireless transceiver; and
a memory in communication with the processor and the wireless transceiver, the memory comprising:
equipment troubleshooting information; and
control instructions that when executed by the processor cause the processor to:
establish a wireless diagnostic link through the wireless transceiver to a mobile device located at a service location;
communicate a wireless analysis link establishment command over the wireless diagnostic link to the mobile device;
instruct the mobile device to capture diagnostic information concerning equipment at the service location via a sensor disposed on the mobile device; and
receive over the wireless diagnostic link, from the mobile device, diagnostic information concerning the equipment at the service location.

12. The diagnostic system of claim 11 where:
the wireless diagnostic link comprises a cellular telephony link.

13. The diagnostic system of claim 11, where the instructions, when executed by the processor, also cause the processor to:
push a diagnostic application to the mobile device, the diagnostic application configured to diagnose the equipment at the service location.

14. A product comprising:
a machine readable memory other than a transitory signal; and
instructions stored on the memory that, when executed by a processor, cause the processor to:
communicate over a wireless diagnostic link with a remote diagnostic system;
receive, at a mobile device located at a service location, a diagnostic command over the wireless diagnostic link from the remote diagnostic system, the diagnostic command configured to instruct the mobile device to capture, via a sensor disposed in the mobile device, diagnostic information concerning a device under test at the service location;
obtain, from the sensor disposed on the mobile device, the diagnostic information; and
communicate the diagnostic information to the remote diagnostic system over the wireless diagnostic link.

15. The product of claim 14, where the instructions further cause the processor to:
receive a troubleshooting action over the wireless diagnostic link; and
execute the troubleshooting action on the device under test through a wireless analysis link established between the device under test and the mobile device.

16. The product of claim 15, where the troubleshooting action comprises an equipment configuration action that the instructions are configured to communicate to the device under test through the wireless analysis link.

17. The product of claim 14, where the wireless diagnostic link comprises a wireless telephony link.

18. The product of claim 14, where:
the instructions are further configured to, when executed, cause the processor to establish a wireless analysis link between the mobile device and the device under test; and
the wireless analysis link comprises a wireless internet link, a Bluetooth link, or both.

19. The diagnostic system of claim 11, where the sensor comprises an image sensor, a microphone, a radiation sensor, a temperature sensor, or any combination thereof.

20. The method of claim 1, where the sensor comprises an image sensor, a microphone, a radiation sensor, a temperature sensor, or any combination thereof.

* * * * *